United States Patent Office 3,567,749
Patented Mar. 2, 1971

3,567,749
PROCESS FOR THE PRODUCTION OF CARBOXYLIC ACID ESTERS FROM NITRILES WITH RECOVERY OF AMMONIA
Walter Neugebauer, Lothar Schmidt, and Gerhard Sperka, Konstanz (Bodensee), Germany, assignors to Deutsche Gold- und Silber-Scheideanstalt vormals Roessler, Frankfurt am Main, Germany
No Drawing. Filed Aug. 8, 1966, Ser. No. 570,688
Claims priority, application Germany, Aug. 11, 1965, D 47,939
Int. Cl. C07c *67/00*
U.S. Cl. 260—468                                           15 Claims

ABSTRACT OF THE DISCLOSURE

Carboxylic acid esters are prepared by reacting carboxylic acid nitriles with alcohols in the presence of water in acid melt at a temperature between 90 and 300° C., the carboxylic acid ester and any unconverted nitrile and alcohol from the melt and heating the melt to a temperature between about 300 and 500° C. to drive off ammonia taken up by the acid salt.

---

The present invention relates to an improved process for the production of carboxylic acid esters from nitriles with the recovery of ammonia.

Carboxylic acid esters in general are produced by reaction of carboxylic acids with alcohols in an acid medium. It is also known that such esters can be produced by reacting the nitriles corresponding to such carboxylic acids with alcohols and water. The acid medium required for the reaction is usually provided by strong mineral acids and especially by sulfuric acid. In the reaction of the nitriles with the alcohols, the mineral acid takes up the ammonia produced in the course of the hydrolysis of the nitriles with the formation of ammonium salts, such as, for example, ammonium bisulfate when sulfuric acid is employed to provide the acid medium.

The ammonium bisulfate containing solutions which remain behind after such nitrile esterification processes are mostly contaminated with by-products produced by the oxidizing and dehydrating action of the sulfuric acid and only seldom can be processed to pure ammonium sulfate in an economically feasible manner. Furthermore, in order to obtain ammonium sulfate, a neutralization of the ammonium bisulfate with ammonia is necessary.

Very often the black colored contaminated ammonium bisulfate solutions are a troublesome and, because of the regulations concerning purification of waste water, an expense necessitating by-product.

According to the invention it was found that carboxylic acid esters can be produced by reaction of nitriles with alcohols with recovery of ammonia, if the nitrile is heated in the presence of water in an acid melt, if necessary under superatmospheric pressure, to a temperature between about 90° C. and about 300° C., preferably between about 125° C. and 270° C., separating off the carboxylic acid ester produced, if necessary, together with any unreacted nitrile and/or alcohol, and driving off the ammonia taken up by the salt melt by heating it to a temperature between about 300° C. and 500° C., preferably between about 350° C. and 450° C. After the melt has been freed of the ammonia it can be reused for esterification and take up of further quantities of ammonia. Advantageously the process is carried out as a cyclic process.

The process according to the invention renders it possible to esterify nitriles with alcohols without consumption of mineral acid and without the production of troublesome ammonium salts and with recovery of the nitrile nitrogen as ammonia. As carboxylic acid nitriles are produced commercially with the aid of ammonia or hydrogen cyanide, it is also possible to recycle the ammonia recovered to the nitrile synthesis either directly or via hydrogen cyanide, which as is known can be produced from hydrocarbons and ammonia.

The acid melts employed according to the invention are melts of such substances which contain acid hydrogen atoms and the term acid melt is employed herein to signify this type of melt. Preferably the acid salts of phosphoric and/or sulfuric acid, especially the acid alkali metal and ammonium salts of such acids are used in the production of such melts. Expediently, salts or salt mixtures with a low melting point are selected for such acid melts. For example, a mixture of 53.5 mol percent of sodium hydrogen sulfate (sodium bisulfate) and 46.5 mol percent of potassium hydrogen sulfate (potassium bisulfate) already melts at 125° C. Mixtures of sodium bisulfate and potassium bisulfate containing between 75 and 35 weight percent of sodium bisulfate and corresponding to a molar ratio of sodium to potassium bisulfate between 3:1 and 3:5 have been found particularly suitable. Another suitable mixture, for instance, is of 83 mol percent of ammonium bisulfate and 17 mol percent of potassium bisulfate which melts at 110.5° C. Still another suitable mixture, for instance, is a mixture of potassium bisulfate, sodium bisulfate, potassium dihydrogen phosphate and ammonium sulfate in a molar ratio of 44:50:11:2 which forms a melt usable at 180° C. The amount of ammonium sulfate is 2% by weight of this mixture.

The acid melts upon cooling down only have a slight tendency to solidify and also remain liquid at temperatures below their regular melting point. Utilizing this phenomena, it is also possible to carry out the esterification according to the invention at temperatures below 100° C. Especially low melting points are obtained, for example, by the addition of cesium hydrogen sulfate and/or lithium hydrogen sulfate which renders it possible to work at temperatures shown to about 93° C. Such a low melting mixture, for example, contains potassium, sodium-, cesium- and lithium hydrogen sulfates and ammonium sulfate in a molar ratio of 12:12:8:12:1.

It has been found advantageous to add neutral salts such as the alkali metal sulfates and/or phosphates to the acid melt. This measure increases the velocity and the completeness of the ammonia desorption. The addition of the neutral salt, for example, sodium or potassium sulfate or mixtures thereof, can amount up to about 20 weight percent of the melt. The neutral salt is only dissolved to a certain extent by the acid melt and the remainder remains suspended in the melt. As this suspended portion remains finely divided, no disturbances are engendered thereby when the melt is recycled.

The esterification of the nitriles with the alcohol is effected at temperatures between about 90 and 300° C. Expediently care is taken to provide for intimate contact between the nitrile, alcohol and acid melt. Depending upon the physical properties of the nitrile and alcohol concerned various types of apparatus can be used for the reaction. With starting substances which are in the gas phase at reaction temperatures, as is the case with acetonitrile and ethanol, it is expedient to use gas-liquid countercurrent columns. With starting substances which are liquid at the reaction temperatures, as is the case with adipic acid dinitrile and n-hexanol, mixing vessels with stirring elements or liquid-liquid countercurrent columns are preferred.

The temperature employed for the esterification depends upon the velocity of the hydrolysis of the nitrile concerned and the thermal stability of the nitrile, alcohol and ester.

In general it is known that the velocity of the reaction increases with increasing temperature. As a consequence, higher temperatures are preferred in order to achieve high space/time yields as long as decompositions and side reactions such as ether formation are not a limiting factor. It is, for example, advisable to work at temperatures up to about 250° C. for the esterification of acrylonitrile with n-butanol to acrylic acid butyl ester and at temperatures up to about 300° C. in the esterification to terephthalic acid dinitrile.

1 mol of water is required for the formation of 1 mol of ester from 1 mol of nitrile and 1 mol of alcohol (provided monofunctional nitriles and alcohols are concerned). This water can be introduced into the esterification step together with the nitrile and the alcohol. However, it also is possible to effect the esterification without admixing water with the nitrile and alcohol, as the nitrile or an intermediate product thereof has the ability to take the water necessary for the reaction from the acid melt. In this connection, the water concerned may be water physically dissolved in the melt as well as water formed by the reaction of bisulfate to pyrosulfate. It is self-understood that the water thus withdrawn from the melt must be resupplied to the melt at some appropriate time if it is to be recycled.

The proportions of the nitrile, alcohol and water can be those theoretically required for the esterification, however, as is known to those skilled in the art, the quantity of the alcohol and/or water can be increased over the stoichiometric quantity in order to obtain a good yield on the nitrile.

According to the invention, it is possible to supply the nitrile and the alcohol, if desired admixed with water, to the acid melt simultaneously or at spaced intervals of time. It can be of advantage to provide for a delayed supply of the alcohol in the esterification of slow reacting nitriles, especially when alcohols are concerned which are disposed to form the corresponding ethers.

It was furthermore found that the application of superatmospheric pressures has a favorable influence on the nitrile esterification. The improvement attained thereby not only involves better nitrile conversion but also a better ester yield. As is known, in esterifications there always is an equilibrium between acid/alcohol on one side and ester/water on the other side. Nitriles can during the esterification form acids in addition to the desired esters. It was unexpectedly found that when the process according to the invention is carried out at superatmospheric pressures the undesired acid producing side reaction is repressed and the desired ester forming reaction promoted. Any acid which may have been formed along with the desired ester can after separation of the ester in a known manner be returned, if desired, with unreacted nitrile and alcohol, to the esterification step with fresh nitrile and fresh alcohol. The application of pressure has been found especially advantageous with such nitriles which at normal pressure are in the gaseous phase at the esterification temperatures employed but which liquify at such temperatures under moderately raised pressures. Examples of such nitriles are acrylonitrile and methacrylonitrile which at a temperature of 170° C., for instance, are present in the liquid phase at a vapor pressure of about 9 and 7 atmospheres respectively. For example, pressures of up to 75 atmospheres and more can be employed.

After the reaction has ended between the nitrile alcohol and acid melt, the organic components can, for example, be separated from the melt by distillation, phase separation or other knwn methods as filtration or extraction.

After the esterification step the melt practically contains no organic components dissolved therein. Incidental organic residues remaining in the melt—whether they be in suspended or physically dissolved form—can be removed by stripping, for instance, with steam and, if desired, be united with the main quantity of organic components.

The recovery of the nitrogen derived from the nitrile group which is present in the acid melt in the form of ammonium ions and/or in the form of a suspension of very finely divided ammonium salt crystals is effected, after removal of the ester formed and also preferably after removal of unused nitrile and alcohol and any carboxylic acid formed, by heating such melt to a temperature between about 300° C. and about 500° C., preferably, between about 350 and 450° C. This causes liberation of gaseous ammonia. The liberation and recovery of ammonia from the melt can be assisted by the introduction of one or more inert gases, such as, air, nitrogen, steam, hydrogen and the like. The use of subatmospheric pressure also assists in the liberation of ammonia from the melt. For example, subatmospheric pressures to 100 mm. Hg can still be employed in an economical manner. If the ammonia recovered by the desorption is to be employed directly for a nitrile synthesis, it is advisable to employ one or more carrier gases which enter into the nitrile synthesis to assist in driving the ammonia out of the melt. The resulting gas mixture can, if necessary, be supplemented with other components for the nitrile synthesis. For example, in the case of an acrylonitrile synthesis, the ammonia can be desorbed with the aid of air and steam and propylene and, if desired, further ammonia can then be admixed with the gas mixture.

During the ammonia desorption, especially when higher temperatures are employed therefor, a portion of the bisulfates can be converted to pyrosulfates with liberation of water. The pyrosulfate formation remains small if steam is employed in the ammonia desorption. It also is possible to reconvert the pyrosulfate formed in the melt either during the esterification step or during the ammonia desorption to bisulfate by introducing steam or even liquid water into the melt at lower temperatures.

It is an especial advantage of the process according to the invention that practically no decomposition products and above all no oxidation products, such as, for example, easily occur, when sulfuric acid is employed as acid medium, are produced during the esterification of the nitriles in the presence of acid melts. The melt even when recycled hardly undergoes any discoloration. Slight yellow colorations which may occur occasionally can be eliminated by blowing air through the melt or the addition of other oxidizing agents, such as, aqueous solutions of hydrogen peroxide.

The acid melts employed according to the invention, as was unexpectedly found, have a stabilizing action on such nitriles and respectively esters which have a tendency to polymerize, such as acrylonitrile and methacrylonitrile and their esters, so that it is possible to carry out the esterification of such nitriles either in the presence of usual polymerization inhibitors, such as, hydraquinonemonomethylether, or in the absence of such substances.

The process according to the invention is applicable to nitriles and dinitriles of aliphatic, cycloaliphatic or aromatic nature. Examples of such nitriles, for instance, are acetonitrile, acrylonitrile, methacrylonitrile, cyanoacetic acid, malonic acid dinitrile, adipic acid dinitrile, benzyl cyanide, terephthalic acid dinitrile, glycolic acid nitrile, cycyopropyl cyanide and the like. Alcohols which can be used for the ester formation are aliphatic, cycloaliphatic and aromatic alcohols. Examples of such alcohols are methanol, ethanol, butanol, glycol, cyclohexanol, benzyl-alcohol, etc.

The following examples will serve to illustrate the process according to the invention.

EXAMPLE 1

27.0 g. of adipic acid dinitrile were introduced into a melt maintained at 170°–180° C. of 230 g. of sodium bisulfate, 252 g. of potassium bisulfate, 30 g. of sodium sulfate and 36 g. of potassium sulfate having a 3 weight percent water content. Thereafter 46.0 g. of ethanol were added at 150° C. A reflux condenser was provided to condense and return the vaporized unreacted ethanol. Care was taken to provide for good mixture of the melt with the refluxed ethanol. After 1 hour's reaction the organic components were distilled off from the melt at reduced pressure and the distillate fractionated. 42.4 g. of adipic acid diethyl ester were obtained corresponding to an 84% yield upon the dinitrile supplied. 4% of the dinitrile were converted to the adipic acid monoethyl ester mononitrile.

The melt which remained was freed of organic substances by the introduction of steam at 290° C. and then heated to 410° C. with introduction of steam to drive out the bound ammonia. 8.1 g. of ammonia were obtained corresponding to 95% of the nitrile nitrogen contained in the dinitrile supplied.

EXAMPLE 2

A solution of 42.5 g. (0.5 mol) of cyanoacetic acid in 18.0 g. (1.0 mol) of water was introduced into a melt of 230 g. of sodium bisulfate and 252 g. of potassium bisulfate at a temperature of 128° C. After about thirty minutes 111.1 g. (1.5 mol) of n-butanol were added to this reaction mixture and the temperature held at 120° C. After elapse of 2 hours the organic phase was distilled off under reduced pressure and fractionated 76.0 g. (0.351 mol) of malonic acid di-n-butyl ester corresponding to a 70% yield on the cyanoacetic acid supplied were obtained.

The melt was heated to 400° C. with introduction of steam in order to recover the ammonia produced. 7.9 g. (0.465 mol) of ammonia were obtained corresponding to 93% of the nitrile nitrogen supplied.

EXAMPLE 3

A gaseous mixture of 10 vol. percent of acetonitrile, 20 vol. percent of n-butanol, 20 vol. percent of water and 50 vol. percent of nitrogen was passed through a melt of 143 g. of sodium bisulfate, 146 g. of potassium bisulfate, 17 g. of sodium sulfate and 18 g. of potassium sulfate maintained at 173° C. under a pressure of 13.4 atmospheres. 20% of the acetonitrile was converted to n-butyl acetate and acetic acid in one pass. 75% of the converted acetonitrile reacted to form n-butyl acetate and 25% to form acetic acid. The unconverted acetonitrile was recovered practically quantitatively.

After 641 normal liters of the gaseous mixture had been passed through the melt, the melt was heated to 440° C. while introducing steam. 9.3 g. of ammonia were set free thereby which correspond to a 95% yield on the nitrile converted.

After cooling the melt which had been freed of ammonia to 176° C. a gaseous mixture of the above composition was again passed therethrough. The conversion in this instance was 22% of the nitrile supplied, 74% of the converted nitrile reacted to n-butyl acetate and 26% to acetic acid. 96% of the unconverted nitrile was recovered.

After 690 normal liters of the gaseous mixture had been passed through the melt, the melt was again heated to 440° C. while introducing steam. 10.1 g. of ammonia were set free thereby corresponding to 96.5/ of the ammonia set free by the saponification of the acetonitrile.

EXAMPLE 4

13.7 g. of acetonitrile, 24.8 g. of n-butanol and 6 g. of water were reacted in a melt of 88.9 g. of sodium bisulfate, 85.8 g. of potassium bisulfate, 10 g. of sodium sulfate and 11 g. of potassium sulfate at a temperature of 200° C. under a pressure of 47 atmospheres. After 1 hour the reaction mixture was cooled to room temperature and the liquid organic phase separated off from the solidified melt and analyzed. 20.4 g. of n-butyl acetate coresponding to a 76% yield on acetonitrile supplied and 3.2 g. of acetic acid and 0.54 g. of unconverted acetonitrile were found.

In order to recover the ammonia produced the solidified melt was heated up again and freed of organic residues by short stripping with steam at 300° C. The ammonia was desorbed from the melt at 440° C. while passing steam therethrough. 5.1 g. of ammonia were recovered corresponding to 94% of the acetonitrile converted.

EXAMPLE 5

17.7 g. of acrylonitrile, 24.75 g. of n-butanol and 6 g. of water were reacted in a melt of 89 g. of sodium bisulfate and 86 g. of potassium bisulfate at a temperature of 200° C. under a pressure of 53 atmospheres. After 1 hour the reaction mixture was cooled to room temperature and the liquid organic phase separated off from the solidified melt and analyzed. 18.6 g. of n-butyl acrylate corresponding to a 48.2% yield on acrylonitrile supplied, 1.7 g. acrylic acid, 0.4 g. solid polymer and 4.62 g. of unconverted acrylonitrile were found.

In order to recover the ammonia produced the solidified melt was heated up again and freed of organic residues by short stripping with steam at 280–300° C. The ammonia was desorbed from the melt at 410° C. while passing equal quantities of air and steam therethrough. 3.6 g. of ammonia were recovered corresponding to 96% of the acrylonitrile converted.

EXAMPLE 6

28.5 g. (0.50 mol.) of glycolic acid nitrile, 148 g. (2.0 mol) of n-butanol and 30 g. of water were reacted in a melt of 230 g. of sodium bisulfate and 252 g. of potassium bisulfate at a temperature of 125 to 130° C. After 1 hour the volatile components of the reaction mixture were distilled off under reduced pressure and fractionated. The thus obtained non-converted n-butanol and the volatile water recovered were recycled and the procedure repeated several times. 46.8 g. (0.354 mol) of glycolic acid n-butyl ester corresponding to a 71% yield on nitrile supplied were obtained. In addition 3.0 g. (0.016 mol) of n-butoxy-acetic acid-n-butyl ester were obtained.

EXAMPLE 7

A mixture of 14.2 g. of glycolic acid nitrile with water and n-butanol in amolar ratio of 1:1:3 were introduced into a melt of 230 g. of sodium bisulfate, 252 g. of potassium bisulfate with a 6 weight percent water content at a temperature of 125° C. After 1 hour the volatile components were distilled off under reduced pressure and thereafter the above described mixture of glycolic acid nitrile, water and n-butyl alcohol again introduced into the melt and after a reaction period of 1 hour the volatile components again distilled off. This procedure was repeated four times more with the same melt. After fractionation of the distillates, 129.5 g. of glycolic acid-n-butyl ester were recovered from the 85.2 g. of glycolic acid nitrile supplied corresponding to 66% of theory. In addition 2.5% of the nitrile supplied were converted to n-butoxy-acetic acid-n-butyl ester.

The melt was then first heated with steam at 275° C. to remove organic residues contained therein. Thereafter it was heated to 400° C. with introduction of steam. 23.4 g. of ammonia were obtained corresponding to 92% of glycolic acid nitrile supplied.

EXAMPLE 8

28.5 g. (0.5 mol) of glycolic acid nitrile, together with 9 g. (0.5 mol) of water and 111.1 g. (1.5 mol) of n-butanol were introduced into a melt of 256 g. of sodium bisulfate, 252 g. of potassium bisulfate, 16 g. of sodium sulfate and 17 g. of potassium sulfate maintained at 137° C. After a reaction period of 1 hour the volatile components were distilled off and fractionated. The unconverted n-butanol and the volatile water recovered thereby were recycled to the melt and the procedure repeated once more. 43.8 g. (0.331 mol) of glycolic acidn-butyl ester and 18.4 g. (0.098 mol) of n-butoxy-acetic acid-n-butyl ester were obtained. This corresponds to a total yield of 86% upon the glycolic acid nitrile supplied.

Thereafter the melt was freed of organic residues by stripping with steam and the ammonia then liberated therefrom by passage of air therethrough at 380° C. 8.1 g. of ammonia (0.478 mol) were recovered corresponding to a 96% yield on the glycolic acid nitrile supplied. After addition of 6 g. of water to reform bisulfate from the pyrosulfate produced during the ammonia desorption the melt again was of the original composition.

EXAMPLE 9

27 g. of adipic acid dinitrile were introduced at 170° C. into a $NH_4HSO_4$-$NaHSO_4$ melt produced from 264 g. of water free ammonium sulfate, 203 g. of 96.0% $H_2SO_4$, 120 g. of sodium bisulfate and 15 g. of water. After reaction had taken place the melt was cooled to 150° C. and 34.5 g. of ethanol added thereto at this temperature. After a reaction period of 1 hour the volatile components were distilled off under reduced pressure and fractionated. 35.7 g. of adipic acid diethyl ester were obtained corresponding to 71% of the adipic acid dinitrile supplied.

Before recovery of ammonia from the melt it was stripped with steam to remove organic residues. Then the ammonia produced by the saponification of the dinitrile was driven out at a temperature of 400–410° C. with the aid of steam. 7.7 g. of ammonia corresponding to a 91% yield in the dinitrile supplied were recovered.

EXAMPLE 10

A solution of 63.8 g. of cyanoacetic acid in 103.6 g. of ethanol was introduced at 140° C. into a melt of 335 g. of sodium bisulfate and 192 g. of potassium bisulfate with a 2.5 weight percent water content. This mixture was maintained at 110° C. for 1½ hours while stirring thoroughly. Thereafter the organic components were distilled off under vacuum. 61.6 g. of malonic acid diethyl ester (51% of theory) were obtained.

We claim:

1. In a process for the production of carboxylic acid esters by reaction of carboxylic acid nitriles with alcohols with recovery of ammonia produced thereby from the nitriles, the steps of heating the carboxylic acid nitrile with the alcohol in the presence of water in an acid salt melt, said melt containing at least one acid salt selected from the group consisting of ammonium and alkali metal hydrogen phosphates and hydrogen sulfates, to a temperature between about 90° and 300° C. to form the carboxylic acid ester, separating the carboxylic acid ester and any unconverted nitrile and alcohol from the melt and heating the melt to temperatures between about 300 to 500° C. to drive off the ammonia taken up.

2. The process of claim 1 in which the carboxylic acid ester is formed at a temperature between about 125° and 270° C. and the melt is heated to a temperature between 350° and 450° C. to drive off the ammonia.

3. The process of claim 1 in which said melt in addition contains 2 to 20% of the weight of the melt of at least one neutral salt selected from the group consisting of ammonium and alkali metal sulfates and phosphates.

4. The process of claim 1 in which the carboxylic acid ester is formed at superatmospheric pressure.

5. The process of claim 1 in which the ammonia is driven off from the melt at subatmospheric pressure.

6. The process of claim 1 comprising in addition passing an inert gas through the melt when it is heated to drive off the ammonia.

7. The process of claim 1 in which the nitrile is heated in the melt prior to introduction of the alcohol.

8. The process of claim 1 in which the nitrile is heated in the presence of the water in the melt prior to introduction of the alcohol.

9. A process according to claim 1 wherein the alcohol is an alkanol having 1 to 6 carbon atoms.

10. A process according to claim 1 wherein the acid salt melt includes at least one alkali metal hydrogen phosphate or sulfate.

11. A process according to claim 1 wherein the nitrile is selected from the group consisting of aliphatic, cycloaliphatic and aromatic nitriles and dinitriles.

12. A process according to claim 11 wherein the alcohol is selected from the group consisting of aliphatic, cycloaliphatic and aromatic alcohols.

13. A process according to claim 1 wherein the nitrile is selected from the group consisting of acetonitrile, acrylonitrile, methacrylonitrile, cyanoacetic acid, malonic acid dinitrile, adipic acid dinitrile, benzyl cyanide, terephthalic acid dinitrile, glycolic acid nitrile and cyclopropyl cyanide and the alcohol is selected from the group consisting of methanol, ethanol, butanol, hexanol glycol, cyclohexyl alcohol and benzyl alcohol.

14. A process according to claim 13 wherein the carboxylic acid ester is formed at a pressure from atmospheric to pressure up to 75 atmospheres.

15. A process according to claim 14 wherein the acid melt includes at least one member of the group consisting of sodium hydrogen sulfate and potassium hydrogen sulfate.

References Cited

UNITED STATES PATENTS

| | | | |
|---|---|---|---|
| 2,816,135 | 12/1957 | Healy, Jr. | 260—486 |
| 3,320,305 | 5/1967 | Wiese | 260—486 |
| 3,377,378 | 4/1968 | Jones | 260—486 |
| 3,419,601 | 12/1968 | Isbell, Jr. | 260—486 |

FOREIGN PATENTS

| | | | |
|---|---|---|---|
| 513,464 | 6/1955 | Canada | 260—486 |

LORRAINE A. WEINBERGER, Primary Examiner

R. GERSTL, Assistant Examiner

U.S. Cl X.R.

260—465.4, 475, 476, 484, 485, 486, 491

UNITED STATES PATENT OFFICE
CERTIFICATE OF CORRECTION

Patent No. 3,567,749     Dated March 2, 1971

Inventor(s) Walter Neugebauer et al.

It is certified that error appears in the above-identified patent and that said Letters Patent are hereby corrected as shown below:

Column 5, line 40, "13.4" should read -- 3.4 --; line "20.4" should read -- 29.4 --.

Signed and sealed this 7th day of September 1971.

(SEAL)
Attest:

EDWARD M. FLETCHER, JR.
Attesting Officer

ROBERT GOTTSCHALK
Acting Commissioner of Pat